United States Patent

Kuenzel et al.

(10) Patent No.: US 9,225,230 B2
(45) Date of Patent: Dec. 29, 2015

(54) DISCHARGING A CAPACITANCE PROVIDED AT THE OUTPUT OF AN INVERTER

(75) Inventors: Benedikt Kuenzel, Geisleden (DE); Carsten Ewig, Kassel (DE); Henrik Wolf, Kassel (DE); Sven Bremicker, Alheim (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 13/294,352

(22) Filed: Nov. 11, 2011

(65) Prior Publication Data

US 2012/0081938 A1    Apr. 5, 2012

Related U.S. Application Data

(63) Continuation of application No. PCT/EP2010/056704, filed on May 17, 2010.

(30) Foreign Application Priority Data

May 18, 2009    (EP) .................................. 09160516

(51) Int. Cl.
*H02M 3/24*    (2006.01)
*H02M 1/12*    (2006.01)
(Continued)

(52) U.S. Cl.
CPC .............. *H02M 1/126* (2013.01); *H02M 3/335* (2013.01); *H02M 3/22* (2013.01); *H02M 2001/0006* (2013.01); *H02M 2001/322* (2013.01)

(58) Field of Classification Search
CPC ......... H02M 1/12; H02M 1/126; H02M 3/22; H02M 3/335; H02M 3/33507; H02M 3/33515; H02M 3/33523

USPC ............. 363/34–38, 74, 78, 95, 97, 123, 124, 363/131–133
See application file for complete search history.

(56) References Cited

U.S. PATENT DOCUMENTS 5,668,705 A *    9/1997    Balch et al. ................. 363/21.16
5,767,631 A        6/1998    Konopka et al.
(Continued)

FOREIGN PATENT DOCUMENTS

CN            201226440 Y        4/2009
DE        102005019215 A1    11/2006
(Continued)

OTHER PUBLICATIONS

International Search Report Dated Feb. 24, 2011 for International Application No. PCT/EP2010/056704. 4 Pages.
(Continued)

*Primary Examiner* — Jeffrey Gblende
(74) *Attorney, Agent, or Firm* — Eschweiler & Associates, LLC

(57) ABSTRACT

A method and device to discharge a filter capacitance at the output of an inverter for feeding electrical power from a generation unit into a grid via a grid connect switch is disclosed. The grid connect switch has a generation unit side and a grid side, and via AC grid terminals on the grid side of the grid connect switch, the filter capacitance is connected to at least one of the AC grid terminals. A voltage applied across the filter capacitance is rectified independent of a polarity thereof, and a rectified voltage of a fixed polarity is provided, and a DC voltage link of a power supply unit for supplying power to circuitry of the inverter is charged with this rectified voltage.

20 Claims, 2 Drawing Sheets

(51) Int. Cl.
*H02M 3/335* (2006.01)
*H02M 3/22* (2006.01)
*H02M 1/00* (2007.01)
*H02M 1/32* (2007.01)

(56) References Cited

U.S. PATENT DOCUMENTS

| | | | | |
|---|---|---|---|---|
| 5,861,744 | A | * | 1/1999 | Earl ................................. 324/166 |
| 5,953,223 | A | | 9/1999 | Kato et al. |
| 6,275,400 | B1 | | 8/2001 | OBreartuin |
| 8,743,572 | B2 | | 6/2014 | Schierling et al. |
| 2005/0012395 | A1 | * | 1/2005 | Eckroad et al. ................. 307/44 |
| 2006/0164875 | A1 | * | 7/2006 | Colombi et al. .............. 363/125 |
| 2007/0210651 | A1 | * | 9/2007 | Ichinose et al. ................ 307/64 |
| 2008/0074078 | A1 | * | 3/2008 | Yang ............................. 320/107 |
| 2009/0059631 | A1 | * | 3/2009 | Krein .............................. 363/95 |
| 2010/0002475 | A1 | * | 1/2010 | Folts et al. ..................... 363/37 |
| 2010/0188869 | A1 | | 7/2010 | Fredette et al. |

FOREIGN PATENT DOCUMENTS

| | | | | |
|---|---|---|---|---|
| EP | | 1331714 | A2 | 7/2003 |
| JP | | 2009095149 | A * | 4/2009 |
| WO | | 2009014522 | A1 | 1/2009 |
| WO | WO | 2009014522 | A1 * | 1/2009 |

OTHER PUBLICATIONS

International Preliminary Report on Patentability dated Dec. 1, 2011 for PCT application No. PCT/EP2010/056704. 7 Pages.
Chinese Office Action for Chinese Patent Application 201080021359.7 dated Oct. 9, 2013.
European Office Action for Application No. 10 720 908.2-1804 dated Jul. 29, 2015.

* cited by examiner

DISCHARGING A CAPACITANCE PROVIDED AT THE OUTPUT OF AN INVERTER

REFERENCE TO RELATED APPLICATIONS

This application is a continuation of International Application No. PCT/EP2010/056704, filed May 17, 2010 entitled, "Discharging a Capacity Provided at the Output of an Inverter", which claims priority to European Patent Application No. 09 160 516.2 entitled "Verfahren zum Entladen einer Entstörkapazität am Ausgang einer Wechselrichtereinrichtung und Wechselrichtereinrichtung," filed on May 18, 2009 and is incorporated herein by reference.

FIELD

The invention relates to a method of discharging a capacitance provided at the output of an inverter that feeds electrical power from a generation unit into a grid and to an inverter that feeds electrical power from a generation unit into a grid that has at least one capacitor connected to at least one of its output terminals. Particularly, the capacitance provided at the output of the inverter is an EMC filter capacitance, and the inverter has at least one EMC filter capacitor, respectively.

BACKGROUND

Any inverter used to feed electrical power from a generation unit into an AC grid, especially those designed as three-phase inverters, should comprise an EMC filter for interference suppression at the output, and to comply with all directives regarding electromagnetic compatibility (EMC). The design of an EMC filter is typically based on a combination of X and Y capacitors providing EMC filter capacitances that are connected between the individual output terminals of the inverter and between the output terminals and ground, respectively. Since the X capacitors have to be provided for each individual phase, the total X capacitance is three times higher in a three-phase inverter than in a single-phase inverter. Directives also require that, whenever an inverter is detached from an AC grid, the charge stored in the EMC filter capacitances must fall below a level that would otherwise be unsafe for humans within a specific period of time. To meet this requirement, the X capacitors at the output of the inverter are usually connected in parallel with discharge resistors that serve to discharge both the X and Y capacitors in the requisite time whenever the inverter is detached from the AC grid. The electrical energy stored in the EMC filter capacitances is then converted into heat. This conversion into heat also occurs while the inverter is running, as long as a voltage is applied to the X capacitors. A power loss will therefore result even if the inverter is not feeding electrical energy into the AC grid. Moreover, this power loss increases with the sum of the EMC filter capacitances at the output of the inverter due to the amount of current needed to flow through the discharge resistors in order to sufficiently discharge all EMC filter capacitances within the requisite time.

For inverters that supply electrical energy to an AC grid from a generation unit that is not permanently available (e.g., a photovoltaic system), it is known that at least a portion of the control and/or communication systems of the inverter is supplied with electrical power from the AC grid rather than the generation unit. Supplying electrical power from the AC grid may also be viewed as an alternative to supplying electrical power from the generation unit. To the end of supplying electrical power from the AC grid, one known inverter comprises a power supply unit that is supplied with a voltage applied to the output of the inverter by the AC grid. This voltage is also present at an EMC filter capacitance at the output of the inverter to which a discharge resistor is connected in parallel.

International Patent Application Publication WO 2009/014522A1 discloses a power system that combines a power source having a DC output with an AC supply from the AC grid to provide AC power to customer's loads and DC power to various DC auxiliary loads. The DC output of the DC power source is connected in steady-state to the DC input of a converter/bi-directional inverter for conversion therein to AC for connection to the customer's loads and to any AC auxiliary loads. During start-up of the DC power source, an open isolation switch disconnects that DC power source from the bi-directional inverter. A start-up power supply selectively connects between the AC power grid and the bi-directional inverter and/or DC controllers to provide a supply of rectified DC power at the inverter DC input and to certain DC auxiliary loads. DC power is supplied to the auxiliary loads from the inverter DC input substantially continuously during start-up and steady state. This power system also includes a sinusoidal or LCL filter between the output of the bi-directional inverter and a grid connect switch.

There still is a need for a method of discharging an EMC filter capacitance and for an inverter having at least one EMC filter capacitor in which a continuous conversion of electrical power into heat by discharge resistors is prevented despite having the EMC filter capacitances discharged at a sufficiently fast rate.

SUMMARY

In one embodiment, the present invention provides a method of discharging a capacitance provided at the output of an inverter that feeds electrical power from a generation unit into a grid via a grid connect switch having a generation unit side and a grid side and via AC grid terminals on the grid side of the grid connect switch, wherein the capacitance is connected to at least one of the AC grid terminals. This method comprises the steps of rectifying any voltage applied across the capacitance independently of its polarity to provide a rectified voltage of fixed polarity, and charging a DC voltage link of a power supply unit of the inverter with the rectified voltage.

In a further embodiment, the present invention provides an inverter configured to feed electrical power from a generation unit into a grid, that comprises a grid connect switch having a generation unit side and a grid side; AC grid terminals on the grid side of the grid connect switch. The inverter further comprises at least one capacitor connected to at least one of the AC grid terminals, a power supply unit configured to supply power to circuitry of the inverter, the power supply comprising a DC voltage link, and a rectifier configured to connect the capacitor to the DC voltage link. The rectifier is configured to rectify any voltage applied across the capacitance independently of its polarity to provide a rectified voltage of fixed polarity, and to charge the DC voltage link with the rectified voltage.

Other features and advantages of the present invention will become apparent to those skilled in the art upon examination of the following drawings and the detailed description. It is intended that all such additional features and advantages be included herein within the scope of the present invention, as defined by the claims.

BRIEF DESCRIPTION OF THE DRAWINGS

The invention will be better understood with reference to the following drawings. The components in the drawings are

DETAILED DESCRIPTION

Figure 1:
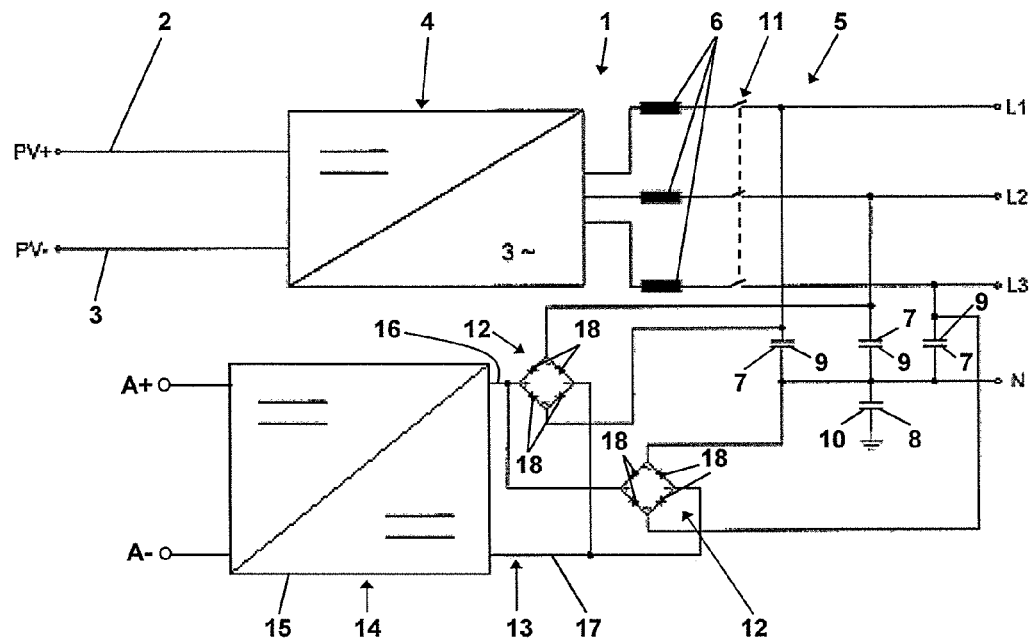
FIG. 1 depicts a first three-phase variant of the inverter according to one embodiment of the invention.

In one embodiment of a new method for discharging a capacitance, particularly an EMC filter capacitance, at the output of an inverter configured to feed electrical power from a generation unit into a grid, any voltage applied across the (EMC filter) capacitance is rectified in order to charge the DC voltage link of the power supply unit which is configured to be powered by the AC grid. In the method, electrical power continuously flows in a discharge direction of the (EMC filter) capacitance, which ensures that the (EMC filter) capacitance is discharged within a short time whenever the inverter is detached from the AC grid. This flow of electrical power, however, is not converted into heat. Instead it is used to energize the power supply unit of the inverter. The direction in which the respective (EMC filter) capacitance is charged depends on the present phase position of the grid, and is conserved when the inverter is detached from the AC grid. Although the power supply unit used by the method comprises a DC voltage link, the direction in which the (EMC filter) capacitance is presently charged by the AC grid is immaterial due to the rectification of the voltage across the (EMC filter) capacitance before it is supplied to the DC voltage link. Given that the power supply unit feeds itself from the DC voltage link, the voltage in the DC voltage link tend to be reduced. If the inverter is detached from the AC grid, the DC voltage link is still recharged by the voltage across the (EMC filter) capacitance, which now results in the (EMC filter) capacitance being discharged within the requisite time.

To rectify the voltage across the (EMC filter) capacitance for supplying it to the DC voltage link, each side of the (EMC filter) capacitance may be connected to both poles of the DC voltage link via a pair of two rectifier diodes. When the (EMC filter) capacitance is detached from the AC grid, the actual charge from one side of the (EMC filter) capacitance flows through one of these rectifier diodes to one of the two DC lines of the DC voltage link, whereas the actual charge from the corresponding other side of the (EMC filter) capacitance flows through another of these rectifier diodes to the respective other of the two DC lines of the DC voltage link. The respective diodes are determined by the charge direction or the polarization of the voltage across the (EMC filter) capacitance.

To discharge all the (EMC filter) capacitances of the inverter provided at the output to a multi-phase AC grid, it is advantageous to have each phase and the neutral line connected to both poles of the DC voltage link via a pair of two rectifier diodes. This wiring scheme has the advantage of being completely independent on which of the two diodes is connected to which phase or neutral line, and that the layout of the circuit is the same for all phases and the neutral line. When each phase and the neutral line are connected to the DC voltage link, then both sides of all X capacitances are connected to the DC voltage link. All Y capacitances can also be discharged into the DC voltage link via these connections.

To provide two pairs of rectifier diodes, an integrated rectifier full bridge may be used as an inexpensive alternative.

According to one embodiment of the invention, a power supply unit is used which maintains its functionality even if the voltage in its DC voltage link decreases to a very low level, so as to allow for the maximum possible discharge of the (EMC filter) capacitances. A power supply unit that relies on a clocked switch to discharge the DC auxiliary circuit is particularly suitable for this purpose. Power supply units of this type are also known as switching power supply units.

Extra buffer capacitance can be added to the DC voltage link. The DC voltage link may also include a residual discharge resistor through which, however, only a small current flows as compared to suitable discharge resistors directly connected in parallel to the (EMC filter) capacitances. This applies both during normal operation and after the inverter has been detached from the AC grid.

The buffer capacitance and the residual discharge resistor may be divided symmetrically and connected to each other at their center points. Further, these connected center points may be grounded. Regarding the DC voltage link, other wiring schemes are also available that are generally known among those skilled in the art and may also be used here. Note, however, that all new inverters will have at least one X capacitance at the output to the AC grid that is not connected in parallel to an ohmic discharge resistor. In one embodiment, all (EMC filter) capacitances at the output to the AC grid are only discharged via the power supply unit, if both the inverter is detached from the AC grid and the grid connector switch is open.

Referring now in greater detail to the drawings, an inverter 1 depicted in FIG. 1 is used for feeding electrical power from a generation unit into a three phase AC grid. In FIG. 1, the generation unit is only indicated by PV+ and PV− terminals at input lines 2 and 3, respectively, that are intended to be connected to a photovoltaic panel, for example. An input DC voltage applied between the input lines 2 and 3 is converted into a three-phase output AC voltage by a DC/AC-converter 4. The three-phase output AC voltage is fed via a grid connect switch 11 to AC grid terminals L1, L2 and L3. The grid terminals L1, L2 and L3 each correspond to one phase line of the AC grid. A further terminal N of the inverter 1 is provided for a neutral line of the AC grid. To meet the requirements of electromagnetic compatibility when feeding electrical power into an AC grid, the inverter 1 comprises an EMC filter 5 on the grid-side of the grid connect switch 11, which includes EMC filter capacitances 7 and 8. Further, a sinusoidal filter is provided on the generator unit side of the grid connect switch 11, which includes inductances 6 provided in each of the lines leading towards the terminals L1 to L3. The EMC filter capacitances 7 are connected as X capacitors 9 between the phase line terminals L1 through L3 and the neutral line terminal N. Note that the X capacitors 9 also provide electric capacitances between the terminals L1 through L3, and that the depicted connection of their neutral point to the neutral line terminal N is only an option. The EMC filter capacitance 8 is provided as a Y capacitor 10 between the terminal N and electric ground. The grid connect switch 11 connected between the sinusoidal filter inductances 6 and the EMC filter capacitances 7 and 8 is a power switch 11 that connects the DC/AC-converter 4 to the AC grid. The grid voltage, however, is applied across the EMC filter capacitances 7 even before this connection is made and remains as long as the inverter 1 is attached to the AC grid via the grid terminals L1 through L3 and N. The grid voltage applied between the AC grid terminals L1 to L3 and N, which normally is an AC voltage, is fed to a DC voltage link 13 of a power supply unit 14 for operating circuitry of the inverter 1 via two rectifier full bridges 12. Generally speaking, the power supply unit 14 serves as a DC/DC-converter 15 that converts the voltage present between the lines 16 and 17 of the voltage link 13 and subject to fluctuations into a constant output DC voltage between its outputs A+ and A−. The entire operating circuitry of the inverter 1 may be supplied with electrical power via the outputs A+ and A−, which means it may operate independently of an input DC voltage between the input lines 2 and 3. Each rectifier full bridge 12 includes four rectifier diodes 18 that are used to connect both sides of one EMC filter capacitance 7 to both input lines 16 and 17 of the DC voltage link 13 via one pair of the rectifier diodes 18. Since all EMC filter capacitances 7 are on one side connected to the neutral line terminal N, only a single pair of the rectifier diodes 18 is needed to connect the neutral line sides of all three EMC filter capacitances 7 to the DC voltage link 13, so that a total of eight rectifier diodes 18 in both rectifier full bridges 12 is sufficient. To charge the DC voltage link 13, it would be sufficient to only rectify the voltage present across one of the EMC filter capacitances 7, even if that would mean that the power supply unit 14 could only be powered with electrical power at the expense of the respective phase, which in turn would result in an unbalanced load. In the present inverter 1, the rectification of the voltages present across all three EMC filter capacitances 7 not only ensures that the DC voltage link 13 is charged, but also that these EMC filter capacitances 7 are discharged whenever the inverter 1 is detached from the AC grid. In this context the term "detached" does not refer to opening the power switch 11, but rather to detaching the AC grid from the AC grid terminals L1 through L3 and N. If this occurs, then all applicable standards must be met in terms of ensuring that the EMC filter capacitances 7 and the EMC filter capacitance 8 are discharged in the requisite time so that any residual charges left on them do not pose an ongoing source of danger. The circuit of the inverter 1 depicted in FIG. 1 is used to discharge all EMC filter capacitances 7, and the terminal N of the neutral line at the rectifier full bridge 12 is used to also discharge the EMC filter capacitance 8 into the DC voltage link 13, while the power supply unit 14 is supplied with electrical power from the DC circuit. Given sufficient power consumption of the power supply unit 14, the usual guidelines for discharging the EMC filter capacitances 7 and 8 at the output of an inverter can easily be met without having discharging resistors connected in parallel to the EMC filter capacitances 7 to this end. The power loss associated with such discharging resistors being permanently connected in parallel to the EMC filter capacitances 7 does not occur in the present inverter 1. Note that even in the present inverter 1 power is permanently drawn in the discharging direction of the EMC filter capacitances, i.e., not only when the EMC filter capacitances 7 and 8 are supposed to be discharged. In the present inverter 1, however, this power is used as the power with which the power supply unit 14 supplies the operating circuitry of the inverter 1.

Figure 2:
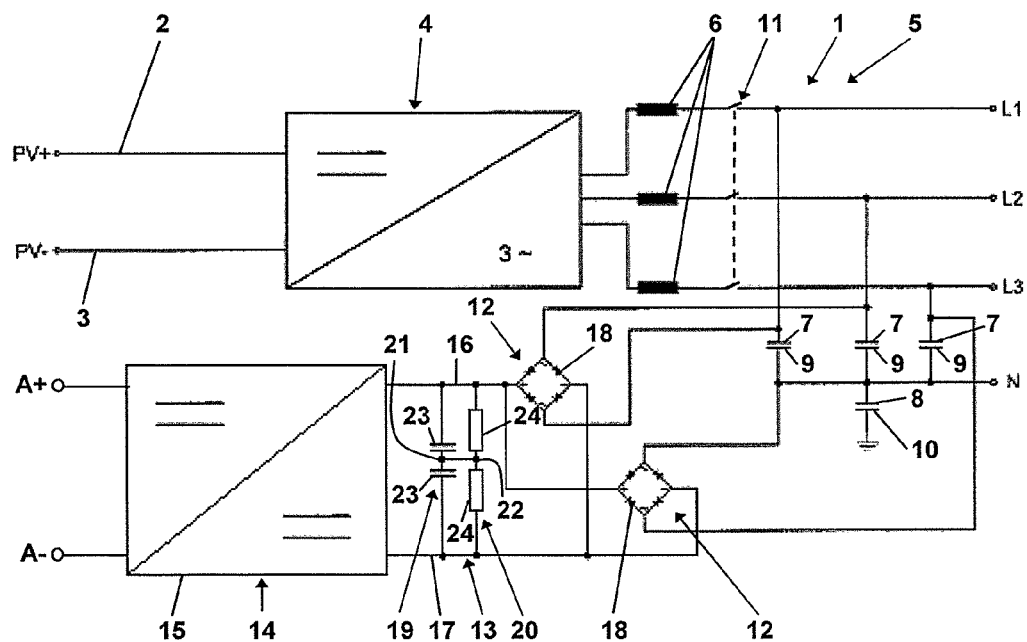
FIG. 2 depicts a second three-phase variant of the inverter according to another embodiment of the invention.

FIG. 2 depicts another embodiment of an inverter according to the invention that, in addition to the embodiment shown in FIG. 1, has a divided buffer capacitance 19 and a divided residual discharge resistor 20 in the DC voltage link 13. The center points 21 and 22 between the two partial capacitances 23 of the buffer capacitance 19 and the two partial resistors 24 of the residual discharge resistor 20 are connected to each other and may be grounded (not depicted here). Other embodiments of the DC voltage link 13 known to those skilled in the art may also be used here. The current flowing through the residual discharge resistor 20 remains comparatively small and is not associated with such a level of power loss which normally occurs with individual discharge resistors connected in parallel to the X capacitors 9.

Figure 3:
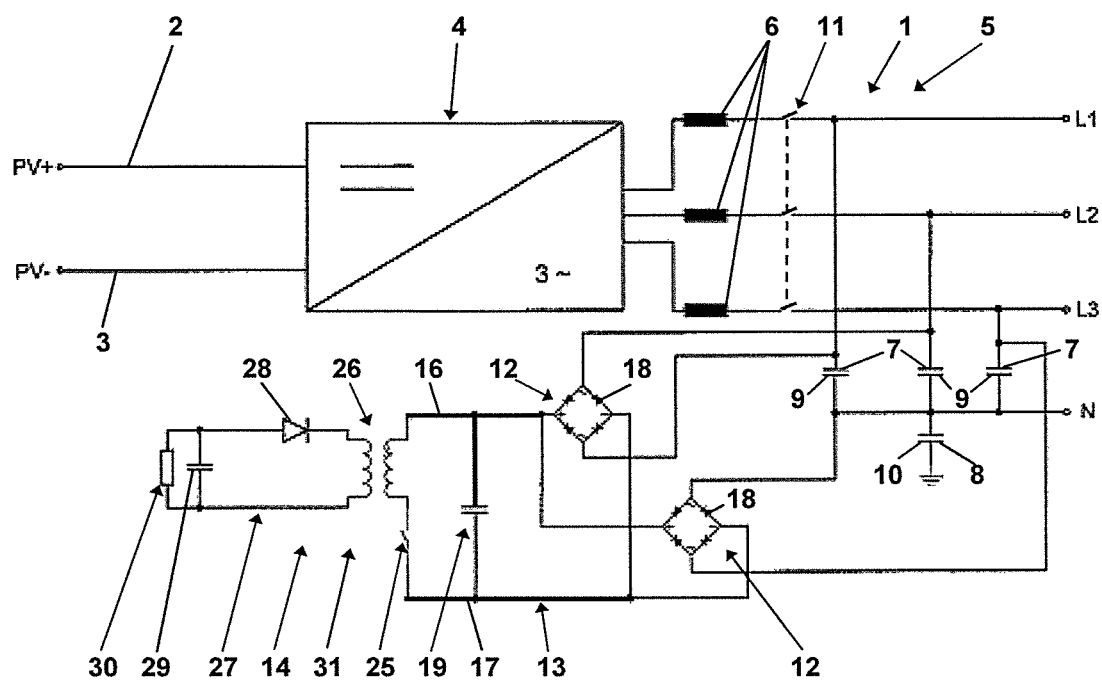
FIG. 3 depicts a third three-phase variant of the inverter according to yet another embodiment of the invention.

FIG. 3 shows another embodiment of the power supply unit 14 designed as a switching power supply unit 31 with a switch 25 and a transformer 26 whose output circuit 27 includes a rectifier diode 28 and a buffer capacitance 29. The operating circuitry of the inverter 1, which is powered by the switching power supply unit 31, is indicated by a resistor 30. Further, an undivided buffer capacitance 19 is provided here in the DC voltage link 13. Designing the power supply unit 14 as a switching power supply unit 31 means that the DC voltage link 13 may be continuously discharged with the falling voltage across the EMC filter capacitances 7 and 8 without impairing the power supplied by the power supply unit 14. As a result, the voltage across the EMC filter capacitances 7 continuously decrease as the charges remaining on the EMC filter capacitances 7 and 8 continuously dissipate via the rectifier full bridges 12 or through the rectifier diodes 18 into the DC voltage link 13.

Many variations and modifications may be made to the preferred embodiments of the invention without departing substantially from the spirit and principles of the invention. All such modifications and variations are intended to be included herein within the scope of the present invention, as defined by the following claims.

The invention claimed is:

1. A method of discharging at least one capacitor provided at an output of an inverter, the method comprising:
   feeding electrical power from a generation unit into a grid via a grid connect switch and via AC grid terminals;
      wherein the grid connect switch has a generation unit side and a grid side;
      wherein the AC grid terminals are connected on the grid side of the grid connect switch;
   providing a charge of the at least one capacitor to at least one of the AC grid terminals on the grid side of the grid connect switch;
   rectifying a voltage applied across the at least one capacitor residing on the grid side of the grid connect switch independent of a polarity thereof to provide a rectified voltage of a fixed polarity;
   charging a DC voltage link of a power supply unit of the inverter with the rectified voltage; and
   discharging the at least one capacitor into the DC voltage link in response to detaching of the grid from the AC grid terminals of the inverter.

2. The method of claim 1, wherein the at least one capacitor comprises an EMC filter capacitor.

3. The method of claim 1, wherein each terminal of the at least one capacitor is connected to the DC voltage link via a pair of two rectifier diodes.

4. The method of claim 1, wherein all AC grid terminals, including a neutral line terminal, are connected to the DC voltage link via a pair of two rectifier diodes.

5. The method of claim 3, wherein at least two of the pairs of two rectifier diodes are combined to form one rectifier full bridge.

6. The method of claim 1, wherein the DC voltage link is discharged via a clocked switch.

7. An inverter configured to feed electrical power from a generation unit into a grid, comprising:
   a grid connect switch having a generation unit side and a grid side;
   AC grid terminals coupled to the grid connect switch on the grid side of the grid connect switch;
   at least one capacitor connected to at least one of the AC grid terminals on the grid side of the grid connect switch;
   a power supply unit configured to provide power to circuitry of the inverter, the power supply comprising a DC voltage link; and a rectifier configured to connect the at least one capacitor to the DC voltage link, and configured to rectify a voltage applied across the at least one capacitor independent of a polarity thereof to provide a rectified voltage of a fixed polarity, and configured to charge the DC voltage link with the rectified voltage;

wherein the at least one capacitor is configured to be discharged into the DC voltage link in response to a detachment of the grid from the AC grid terminals of the inverter.

8. The inverter of claim 7, wherein the at least one capacitor comprises an EMC filter capacitor.

9. The inverter of claim 7, wherein the rectifier connects each terminal of the at least one capacitor to the DC voltage link via a pair of two rectifier diodes.

10. The inverter of claim 7, wherein the rectifier connects all AC grid terminals, and a neutral line terminal, to the DC voltage link via a pair of two rectifier diodes, respectively.

11. The inverter of claim 7, wherein the rectifier comprises at least two pairs of two rectifier diodes combined into one rectifier full bridge.

12. The inverter of claim 7, wherein the grid is a three-phase grid, wherein the at least one capacitor comprises a capacitor connected between the AC grid terminal for each phase of the grid and the AC grid terminal for a neutral line, respectively.

13. The inverter of claim 12, wherein the rectifier comprises:
a first rectifier full bridge connected to the AC grid terminals for two of the grid phases; and
a second rectifier full bridge connected to the AC grid terminals for the corresponding third phase and a neutral line.

14. The inverter of claim 7, wherein the power supply unit comprises a switching power supply unit.

15. The inverter of claim 14, wherein the switching power supply unit includes a clocked switch configured to selectively discharge the DC voltage link.

16. The inverter of claim 7, further comprising a buffer capacitor connected between DC lines of the DC voltage link and the power supply unit.

17. The inverter of claim 7, further comprising a discharging resistor connected between DC lines of the DC voltage link and the power supply unit.

18. The inverter of claim 16, wherein the buffer capacitor comprises a split buffer capacitor, and wherein a split discharging resistor is connected between DC terminals of the power supply, the split buffer capacitor and the split discharging resistor being interconnected at midpoints thereof.

19. The inverter of claim 7, wherein the at least one capacitor is dischargeable over the DC voltage link, if the grid connect switch is open and if the grid is detached from the AC grid terminals.

20. The inverter of claim 7, wherein no discharge resistor is connected in parallel to the at least one capacitor connected to the AC grid terminals.

* * * * *